United States Patent
Arnon et al.

(10) Patent No.: US 6,772,198 B2
(45) Date of Patent: *Aug. 3, 2004

(54) SYSTEM AND METHOD FOR RESTORING PREVIOUSLY BACKED-UP DATA IN A MASS STORAGE SUBSYSTEM

(75) Inventors: Dan Arnon, Boston, MA (US); Yuval Ofek, Boston, MA (US)

(73) Assignee: EMC Corporation, Hopkinton, MA (US)

(*) Notice: Subject to any disclaimer, the term of this patent is extended or adjusted under 35 U.S.C. 154(b) by 133 days.

This patent is subject to a terminal disclaimer.

(21) Appl. No.: 10/142,478

(22) Filed: May 10, 2002

(65) Prior Publication Data

US 2002/0133559 A1 Sep. 19, 2002

Related U.S. Application Data

(62) Division of application No. 09/268,494, filed on Mar. 11, 1999.

(51) Int. Cl.[7] .............................................. G06F 15/16
(52) U.S. Cl. ...................... 709/208; 709/203; 707/202; 707/204
(58) Field of Search ................................ 709/203, 208; 707/202, 204

(56) References Cited

U.S. PATENT DOCUMENTS

| | | | | |
|---|---|---|---|---|
| 5,671,350 A | * | 9/1997 | Wood ........................ | 714/15 |
| 5,748,100 A | * | 5/1998 | Gutman et al. ............ | 340/7.22 |
| 6,073,128 A | * | 6/2000 | Pongracz et al. ............ | 707/3 |
| 6,073,222 A | * | 6/2000 | Ohran ........................ | 711/162 |
| 6,173,376 B1 | * | 1/2001 | Fowler et al. ............... | 711/162 |
| 6,535,934 B2 | * | 3/2003 | Troxel et al. ................ | 710/31 |
| 6,611,850 B1 | * | 8/2003 | Shen ........................... | 707/204 |

FOREIGN PATENT DOCUMENTS

WO    WO 9844423 A1 * 10/1998

* cited by examiner

Primary Examiner—Hosain Alam
Assistant Examiner—Oanh Duong
(74) Attorney, Agent, or Firm—Penelope S. Wilson; John M. Gunther (57) ABSTRACT

In a system that includes a back-up subsystem comprising back-up media, a mass storage subsystem connected to the back-up subsystem, and a host connected to the mass storage subsystem, the mass storage subsystem, as master and independent of the host, requests the restore operation by providing to the back-up subsystem, as slave, data identifiers identifying multiple data items to be transferred during the restore operation. The back-up subsystem determines its preferred ordering for retrieval of the requested plurality of data items from the back-up media. The back-up subsystem provides the requested data items to the mass storage subsystem in the determined preferred order in a plurality of iterations, each iteration identified by a data item identifier for the data item to be transferred in the current iteration.

11 Claims, 5 Drawing Sheets

*FIG. 1*

100. MASS STORAGE SUBSYSTEM 12(m) PROVIDES TO THE BACKUP CONTROL MODULE 14 IDENTIFICATION INFORMATION IDENTIFYING THE DISK EXTENT(S) OR PORTION(S) THEREOF WHOSE INFORMATION IS TO BE TRANSFERRED BY THE BACKUP CONTROL MODULE 14 TO THE MASS STORAGE SUBSYSTEM 12(m) DURING THE RESTORE OPERATION

↓

101. BACKUP CONTROL MODULE 14 DETERMINES AN OPTIMAL ORDERING OF THE DISK EXTENT(S) OR PORTION(S) THEREOF FOR RETRIEVAL FROM THE BACKUP MEDIA 15

↓

102. BACKUP CONTROL MODULE 14 PROVIDES THE IDENTIFICATION INFORMATION FOR THE DISK EXTENT(S) OR PORTION(S) THEREOF TO BE TRANSMITTED TO THE MASS STORAGE SUBSYSTEM 12(m) DURING THE FIRST ITERATION ALONG WITH THE UNIT_CHK UNIT CHECK SIGNAL

↓

103. MASS STORAGE SUBSYSTEM 12(m) RETURNS TO THE BACKUP CONTROL MODULE 14 THE IDENTIFICATION INFORMATION THAT IT RECEIVED IN STEP 102, ALONG WITH THE RD_LOC SIGNAL

↓

104. BACKUP CONTROL MODULE 14 RETRIEVES THE INFORMATION ASSOCIATED WITH THE DISK EXTENT(S) OR PORTION(S) THEREOF IDENTIFIED IN THE IDENTIFICATION INFORMATION RECEIVED IN STEP 103

SYSTEM AND METHOD FOR RESTORING PREVIOUSLY BACKED-UP DATA IN A MASS STORAGE SUBSYSTEM

This is a division of application Ser. No. 09/268,494, filed Mar. 11, 1999, now U.S. Pat. No. 6,424,999 B1.

FIELD OF THE INVENTION

The invention relates generally to the field of digital data processing systems and, more particularly, to digital data storage and backup subsystems. The invention provides a system and method for efficiently transferring information to be restored from a backup subsystem in which information is backed up to a mass storage subsystem during a restore operation.

BACKGROUND OF THE INVENTION

Digital computer systems are used in a number of applications in which virtually continuous availability of data is important to the operation of businesses or other entities using the systems. Generally, computer centers will periodically produce back-up copies of data on their various digital computer systems. Such back-up copies are usually not maintained on a continuous basis, but instead at particular points in time, often at night when the normal processing load on the computer centers is reduced and modifications to the data being backed up may be minimized, and in any case represent the data at the particular points in time at which the back-up copies are generated. Accordingly, if a failure occurs between back-ups, data which has been received and processed by the digital computer systems since the last back-up copy was produced, may be lost. Typically, such back-up copies will be maintained by the computer centers at their respective sites so that they may be used in the event of a failure, although some off-site archival back-ups may be maintained. Significant additional problems arise in the case of, for example, catastrophic events that can occur, such as may result from, for example, fire, flood or other natural disasters, intentional tampering or sabotage and the like, which may result in unintentional or intentional damage to an entire site or some significant portion thereof, since some or all of the back-up copies may also be damaged and the data contained thereon may be unavailable.

SUMMARY OF THE INVENTION

The invention provides a new and improved system and method for restoring previously backed-up data to a mass digital data storage subsystem, and more specifically a system and method for efficiently transferring information to be restored from a backup subsystem in which information is backed up to a mass storage subsystem during a restore operation.

In brief summary, the invention provides a system comprising a mass storage subsystem, as a master device and backup subsystem, as a slave device, the slave device transferring data items to the master device during a restore operation. Each data item to be restored is identified by a data item identifier. The master device is configured to, in each of a plurality of iterations, receive from the slave device data item identifiers identifying a data item transferred during a previous iteration and a data item to be transferred during the current iteration and to request the slave device to transfer the data item to be transferred, the master device being further configured to use the data item identifier that it receives from the slave device identifying the data item transferred during the previous iteration to confirm that the data item corresponded to the data item that was to have been transferred during the previous iteration. The slave device is configured to, in each iteration, provide the master device with the data item identifiers identifying the data item transferred during the previous iteration and the data item to be transferred during the current iteration and transfer the data item to be transferred during the iteration to the master device when requested by the master device.

In one embodiment, the master device is further configured to initially provide the slave device with a list of data item identifiers and to thereafter control the transfer of data item from the slave device to the master device in a plurality of iterations, and the slave device is further configured to receive the data item identifier list from the master device and order the data item identifiers thereon in an order that it prefers for transfer to the master device. In that embodiment, the data items to be transferred are stored on a serial information store, such as a magnetic tape, and the slave device determines the ordering to provide for optimal retrieval of the data items from the information store.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
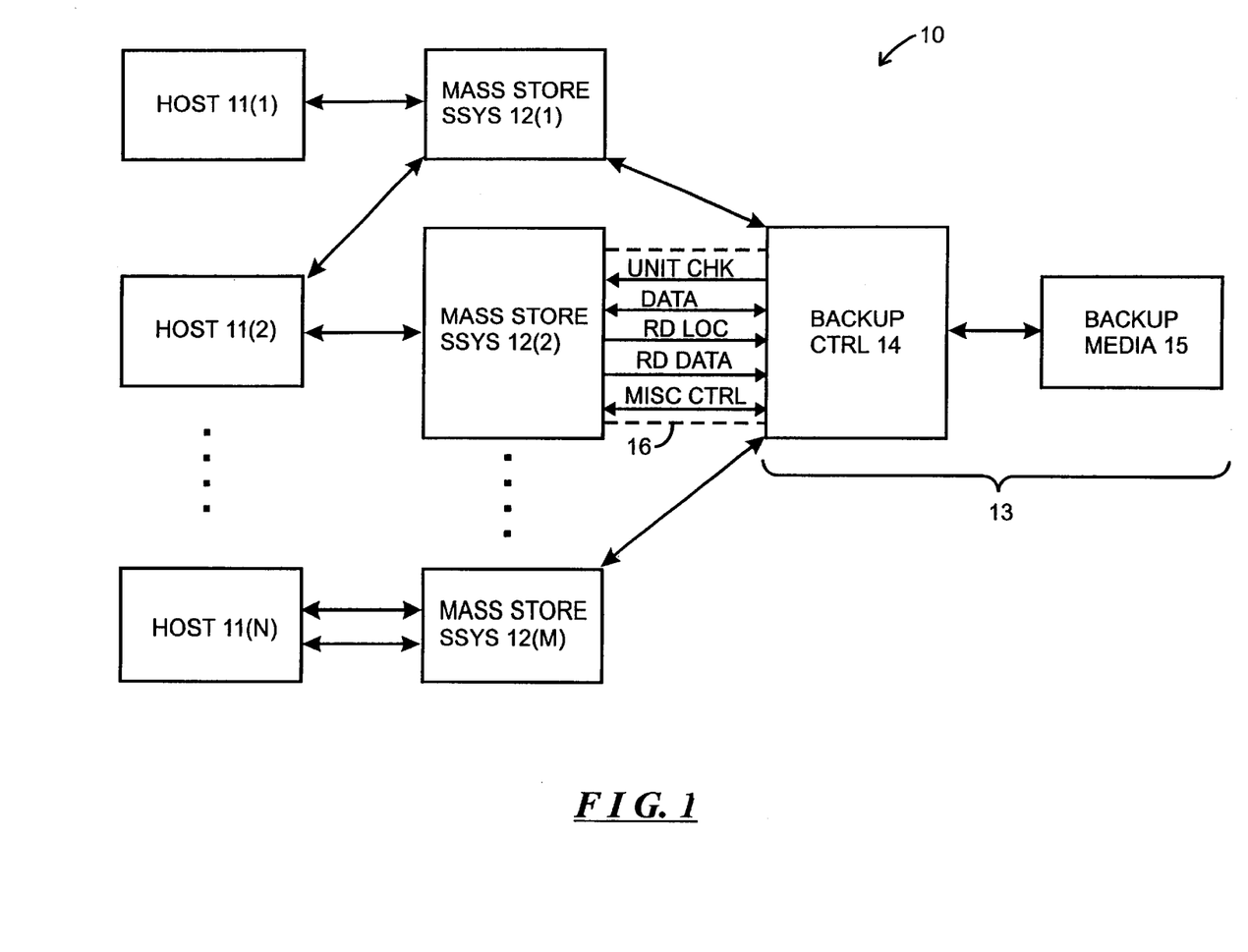
FIG. 1 is a functional block diagram of a digital data processing system constructed in accordance with the invention.

FIG. 1 is a functional block diagram of a digital data processing system 10 constructed in accordance with the invention. With reference to FIG. 1, digital data processing system 10 includes one or more host computers 11(1) through 11(N) (generally identified by reference numeral 11(n), one or more mass storage subsystems 12(1) through 12(M) (generally identified by reference numeral 12(m) and a backup subsystem 13. Each host computer 11(n) may comprise, for example, any of a number of types of conventional computers. In one embodiment, host computers 11(n) generally comprise mainframe computers such as those sold by International Business Machines Corp., although it will be appreciated that the host computers 11(n) may include other types of computers, such as minicomputers, personal computers, workstations, and the like.

The mass storage subsystems 12(m) store information used by the host computers 11(n) in their processing, and receives processed information from the host computers 11(n) for storage. Each host computer 11(n) may connect to one or more mass storage subsystems 12(m) (reference, example, the connections between host computers 11(1) and 11(2), and mass storage subsystems 12(1) and 12(2)), and a host computer 11(n) may connect to a single mass storage subsystem 12(m) over multiple channels (reference, for example, the connections between host computer 11(N) and mass storage subsystem 12(M)). Each mass storage subsystem 12(m) includes a mass- or secondary-storage subsystem which stores data in disk-based storage. In one embodiment, a mass storage subsystem 12(m) comprises the mass storage subsystem similar to that described in, for example, U.S. Pat. No. 5,206,939, entitled "System And Method For Disk Mapping And Data Retrieval," issued Apr. 27, 1993 to Moshe Yanai, et al, U.S. patent application. Ser. No. 07/893,509 filed Jun. 4, 1995, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al., all of which are assigned to the assignee of the present invention and incorporated herein by reference, although it will be appreciated that any mass storage subsystem may be used with the present invention. In that embodiment, the mass storage subsystems 12(m) include one or more disk storage units which store information in a basis which permits the host computers 11(n) to retrieve the information from the respective mass storage subsystems 12(s), and provide processed information for storage on the mass storage subsystem 12, on a relatively random basis. In addition, in that embodiment, the mass storage subsystem 12 utilizes large cache memories to cache information retrieved from the disk storage units to be transferred to the host computers 11(n) for processing, as well as updated information provided by the host computers 11(n) to be transferred to the disk storage units for storage. Each mass storage subsystem 12(m) may store information in multiple mirrors, which can provide some online protection for continued availability of the information stored therein in the event of failure of some portions of the respective mass storage subsystem 12(m).

The backup subsystem 13 is provided to back up information stored on the mass storage subsystems 12(m). In the event of a malfunction on one or more of the mass storage subsystems 12(m), which may render some or all of the information stored thereon unavailable to the host computers 11(n), the backed-up information can be restored from the backup subsystem 13 to another mass storage subsystem, or to the same mass storage subsystem 12(m) after the malfunction has been corrected. After the information has been restored, it (that is, the restored information) will thereafter be available to the host computers 11(n) which are connected to the mass storage subsystem 12(m) to which the information was restored. In one embodiment, the backup subsystem 13 includes a mass data storage facility similar to that described in U.S. patent application Ser. No. 08/774,121, filed Dec. 23, 1996, in the name of Haim Bitner, et al., entitled "Remote Mass Data Storage Facility For Digital Data Processing System(s)," assigned to the assignee of the present invention and incorporated herein by reference.

In that embodiment, the backup subsystem 13 includes a backup control module 14 and a backup media module 15. During a backup operation, the backup control module 14 cooperates with a host computer 11(n) that initiates the backup operation and the mass storage subsystem 12(m) on which the information to be backed up is stored, to control backup operations during which information to be backed up is received from the mass storage subsystem 12(m) for storage on backup media that is maintained by the backup media module 15. In one embodiment, the backup media module 15 includes a conventional autochanger (not separately shown) in which backed-up information is stored on backup media in the form of tape cartridges. During a backup operation, the backup control module 14 provides the information received from a mass storage subsystem 12(m) to the backup media module 15 for storage on the backup media. During a restore operation, the backup control module 14 cooperates with a host computer that initiates the restore operation and the mass storage subsystem 12(m) on which previously backed up information is to be restored, to retrieve information to be restored from the backup media module 15 and provide it to the mass storage subsystem 12(m). The mass storage subsystem 12(m) will store the information that it receives from the backup control module 14 on respective ones of its disk storage units, after which the restored information will be available for use by the host computer(s) 11(n) which are connected to that mass storage subsystem 12(m).

Generally, the information as processed by the host computers 11(n) is organized in files. Each file, in turn, is stored on a mass storage subsystem 12(m) in one or more disk extents on respective disk storage units maintained by the respective mass storage subsystem 12(m). Each disk storage unit stores data in fixed-size logical blocks, which are identified by successive block identifiers, and a disk extent in which information from a file is stored is identified by a base block identifier identifying, for example, the first logical block in the disk extent, and a length identifier identifying the number of successive logical blocks comprising the disk extent. Information from a number of files may be backed up during a single backup operation. In a backup operation, the which the information to be backed up is stored cooperate to identify the disk extents which contain the information to be backed up.

After the disk extents are identified, control circuitry (not separately shown) which controls the mass storage subsystem 12(m) retrieves the data from the respective disk extents of the disk storage units (also not separately shown) on the mass storage subsystem 12(m) and transfers them (that is, the disk extents) to the backup control module 14, which, in turn, forwards them (that is, the disk extents) to the backup media 15 for storage. The mass storage subsystem 12(m) transfers the information from each disk extent in a separate block transfer over the interconnection 16 interconnecting the mass storage subsystem 12(m) and the backup control module 14. Generally, the order in which the information from the disk extents are retrieved from the disk storage units and provided to the backup control module 14 may not be in the order in which the information is contained in the respective files, but instead may be optimized for retrieval from the respective disk storage units; in that case, the information provided to the backup control module 14 will generally not be in the order in which the information is stored in the respective files. The backup control module 14, in a backup catalog, maintains a record of the particular locations on the tape cartridges on which the backed up information from the respective up disk extents is stored.

Similarly, during a restore operation to restore one or more the host computer 11(n) which initiates the restore operation and the mass storage subsystem 12(m) on which the information is to be restored (which may be a different mass storage subsystem 12(m) which on which the information was stored during the backup operation), cooperate to identify the disk extent or extents in which the information is to be restored. The disk extents to which the information is to be restored may, in turn, be different from the disk extents in which the information was originally stored, and information which was backed up from a single disk extent may be stored in plurality of disk extents during the restore operation. Generally, during a restore operation, the mass storage subsystem 12(m) will initially identify to the backup control module 14 the information that is to be restored by identifying the particular disk extents or portions thereof which that had previously been backed up, which are to be restored during the restore operation. The disk extents as identified by the mass storage subsystem 12(*m*) may not be in the order which would be optimal for retrieval from the backup media 15, but instead will be in an order which is optimal for retrieval from the backup media 15, without regard to the order specified by the mass storage subsystem 12(*m*).

It will be appreciated that, during both a backup operation and a restore operation, the mass storage subsystem 12(*m*) from which data is being backed up or to which data is being restored, operates as a master device, with respect to the backup control module 14. That is, during a backup operation, the mass storage subsystem 12(*m*) operates to control the transfer of information to be backed up, and the order in which the information is transferred. On the other hand, during a restore operation, the mass storage subsystem 12(*m*) also controls the transfer of information to be restored, but it does not control the order in which the information is transferred. In one embodiment, the mass storage subsystems 12(*m*) and backup control module 14 are interconnected by connection 16 comprising an interconnection arrangement, such as an ESCON interconnection arrangement, in which one unit connected to the connection 16, in this case the mass storage subsystem 12(*m*), serves as a master device, and the other unit connected to the connection 16, in this case the backup control module 14, operates as a slave device. The invention provides an arrangement for, during a restore operation, enabling the backup control module 14 and the mass storage subsystem 12(*m*) to efficiently transfer information therebetween that is to be restored to the mass storage subsystem 12(*m*).

Generally, the connection 16 includes arrangements for transferring a plurality of signals, including, and with particular regard to a restore operation, (i) a bidirectional arrangement for transferring DATA data signals between the mass storage subsystem 12(*m*) and the backup control module 14,
   (ii) a unidirectional arrangement for transferring a RD_LOC read data signal from the mass storage subsystem 12(*m*), as the master device, to the backup control module 14, as the slave device;
   (iii) a unidirectional arrangement for transferring a RD_DATA read data signal from the mass storage subsystem 12(*m*), as the master device, to the backup control module 14, as the slave device; and
   (iv) a unidirectional arrangement for transferring a UNIT_CHK unit check signal from the backup control module 14, as the slave device, to the mass storage subsystem 12(*m*), as the master device.

In addition, the connection 16 may comprise miscellaneous uni- and bi-directional arrangements for transferring MISC_CTRL miscellaneous control and/or status signals between the mass storage subsystem 12(*m*) and the backup control module 14, including arrangements for transferring signals for controlling the transfer of information from the mass storage subsystem 12(*m*) to the backup control module 14 to be backed up during a backup operation. Each of these arrangements (i) through (iv) may comprise, for example, separate lines or other signal transfer mechanisms, which will be apparent to those skilled in the art, for transferring the respective signals, or alternatively some or all of the respective signals may be multiplexed onto the same lines or respective other signal transfer mechanisms.

For interconnection arrangement 16, the DATA signals comprise, during a backup operation, the information provided by the mass storage subsystem 12(*m*) to the backup control module 14 that is to be backed up during the backup operation, and, during a restore operation, the information provided by the backup control module 14 to the mass storage subsystem 12(*m*) that is to be restored during the restore operation. In addition, the DATA signals comprise control information provided by the mass storage subsystem 12(*m*) to the backup control module 14, which includes, with particular regard a restore operation, the identification information identifying the particular information that is to be provided by the backup control module 14, and more specifically the identification of a particular disk extent or portion thereof to be subsequently transferred by the backup control module 14 to the mass storage subsystem 12(*m*). When the mass storage subsystem 12(*m*) transfers DATA signals comprising the identification information, identifying the information to be provided by the backup control module 14 during a restore operation, it (that is, the mass storage subsystem 12(*m*)) will also generate the RD_LOC read location signal thereby to identify the DATA signals as the identification information. In response to the RD_LOC read location signal, the backup control module 14 will receive the DATA signals and use them in to identify the information, that is, the particular disk extent(s) or portion thereof, that it is to subsequently transfer to the mass storage subsystem 12(*m*). When the backup control module 14 is to subsequently transfer the information identified by previously-provided identification information, the mass storage subsystem 12(*m*) will generate the RD_DATA read data signal. When the mass storage subsystem 12(*m*) generates the RD_DATA read data signal, the backup control module 14 transfers the information (that is, the information that had previously been identified by DATA signals provided by the mass storage subsystem 12(*m*) when the RD_LOC signal was asserted) as DATA signals to the mass storage subsystem 12(*m*).

As noted above, the UNIT_CHK unit check signal is provided by the backup control module 14 to the mass storage subsystem 12(*m*). The slave device connected to connection 16 normally uses the UNIT_CHK unit check signal to notify the master device of the occurrence of an event on the slave device requiring service by the master device. In connection with a restore operation, the backup control module 14 uses the UNIT_CHK unit check signal to notify the mass storage subsystem 12(*m*) of the identification of the successive disk extent or portions thereof that are to be provided by the backup subsystem 13 to the mass storage subsystem 12(*m*). The backup control module 14 determines the After the mass storage subsystem 12(*m*) receives each identification information, it will then use the identification information provided by the as the identification information that it transmits to the backup control module 14 along with the RD_LOC read location signal, to identify the information that the backup subsystem 13 is to transmit to the mass storage subsystem 12(*m*). Thereafter, when the mass storage subsystem 12(*m*) provides the RD_DATA signal, the backup control 14 will transmit the just-identified information to the mass storage subsystem 12(*m*). These operations will be repeated through a number of iterations until all of the information to be restored has been provided by the backup subsystem 13 to the mass storage subsystem 12(*m*).

The identification information provided by the backup control module 14 to the mass storage subsystem 12(*m*) in each iteration after the first iteration, instead of being the identification of a single disk extent or portion thereof, or set of disk extents or portions to be transferred during the iteration, will be two such identifications, including (i) the identification information for the disk extent(s) or portion(s) thereof whose information was (were) provided in the previous iteration, and (ii) identification information that identifies the next disk extent(s) or portion(s) thereof whose information is to be provided by the backup control module 14 to the mass storage subsystem 12(*m*) during the iteration.

For the first iteration, the backup control module 14 will only provide identification information corresponding to item (ii) above, that is, identification information that identifies the next (in this case, the first) disk extent(s) or portion(s) thereof whose information is to be provided by the backup control module 14 to the mass storage subsystem 12(*m*) during the iteration. The mass storage subsystem 12(*m*) uses the just-provided identification information (item (i) above) as a "sanity" check to ensure that the information previously provided Thus, if, for example, in the first iteration, the backup control module 14 provided, along with the UNIT_CHK unit check signal, the identification information "A," (where "A" identifies disk extent(s) or portion(s) thereof whose information was previously backed up) in that iteration the mass storage subsystem 12(*m*) will provide, along with the RD_LOC read location signal, the identification information "A" and, when the mass storage subsystem 12(*m*) provides the RD_DATA read data signal, the backup subsystem 13 will transfer the information identified by "A" to the mass storage subsystem 12(*m*) as DATA signal.

In the next iteration, if the backup control module 14 provided the information identified by "A" to the during the first iteration, it will provide, along with the UNIT_CHK signal, the identification information "A/B" (where "B" also identifies a disk extent(s) or portion(s) thereof whose information was previously backed up). If the backup control module 14 did not provide information identified by "A" during the first iteration, it will instead provide identification information "x/B," where "x" represents the identification of the disk extent(s) or portion(s) thereof that were transferred during the first iteration. After the backup control module 14 provides this identification information "A/B" to the mass storage subsystem 12(*m*), the mass storage subsystem 12(*m*) will use the "A" portion of the identification information "A/B," or the "x" portion of the identification information "x/B") as a "sanity check" to verify that the information that was transferred to the mass storage subsystem 12(*m*) was, indeed, the information from disk extent or portion "A." The mass storage subsystem 12(*m*) will use the "B" portion of the identification information as the identification of the information to be requested during the iteration. That is, the mass storage subsystem 12(*m*) will transmit the identification information "B" to the backup control module 14 along with the RD_LOC read location signal. When the mass storage subsystem 12(*m*) thereafter provides the RD_DATA read data signal, the backup subsystem 13 will transfer the information identified by "B" to the mass storage subsystem 12(*m*).

In the next iteration, the backup control module 14 will provide, along with the UNIT_CHK signal, the identification information "B/C" (where "C" also identifies a disk extent or portion thereof whose information was previously backed up). If the backup control module 14 did not provide information identified by "A" during the first iteration, it will instead provide identification information "x/C," where "x" represents the identification of the disk extent(s) or portion (s) thereof that were transferred during the second iteration. After the backup control module 14 provides this identification information "B/C" to the mass storage subsystem 12(*m*), the mass storage subsystem 12(*m*) will use the "B" portion of the identification information "B/C," or the "x" portion of the identification information "x/C" as a "sanity check" to verify that the information that was transferred to the mass storage subsystem 12(*m*) was, indeed, the information from disk extent or portion "B." The mass storage subsystem 12(*m*) will use the "C" portion of the identification information as the identification of the information to be requested during the iteration. That is, the mass storage subsystem 12(*m*) will transmit the identification information "C" to the backup control module 14 along with the RD_LOC read location signal. When the mass storage subsystem 12(*m*) thereafter provides the RD_DATA read data signal, the backup subsystem 13 will transfer the information identified by "C" to the mass storage subsystem 12(*m*).

These operations can continue through a series of iterations, until the backup control module 14 provides identification information "Z/null" (where "Z" identifies a disk extent or portion thereof whose information was previously backed up, and "null" is a restore operation termination indicator) to the mass storage subsystem 12(*m*).

If the backup control module 14 did not provide information identified by "A" during the first iteration, it will instead provide identification information "x/null," where "x" represents the identification of the disk extent(s) or portion(s) thereof that were transferred during the second iteration. After the backup control module 14 provides this identification information "Z/null" to the mass storage subsystem 12(*m*), the mass storage subsystem 12(*m*) will use the "z" portion of the identification information "Z/null," or the "x" portion of the identification information "x/null") as a "sanity check" to verify that the information that was transferred to the mass storage subsystem 12(*m*) was, indeed, the information from disk extent or portion "Z." The "null" restore operation termination indicator indicates that the information identified by identification information "Z" is the last information to be transferred during the restore operation, and so the restore operation will be complete.

As noted above, during each iteration after the first, a portion of the identification information provided by the backup control module to the mass storage subsystem 12(*m*) serves as a "sanity check" to verify that the information transferred by the backup control module 14 to the mass storage subsystem 12(*m*) during the previous iteration was from the backed-up disk extent or portion that was to be transferred during the previous iteration. If, during an iteration, the mass storage subsystem 12(*m*) receives identification information which does not conform to the identification of the information that was to be provided during the previous iteration, it (that is, the mass storage subsystem 12(*m*)) can determine that an error has occurred. Thereafter, the mass storage subsystem 12(*m*) and the backup control module 14 can cooperate to correct the error, or the mass storage subsystem 12(*m*) can terminate the restore operation.

Figure 2A:
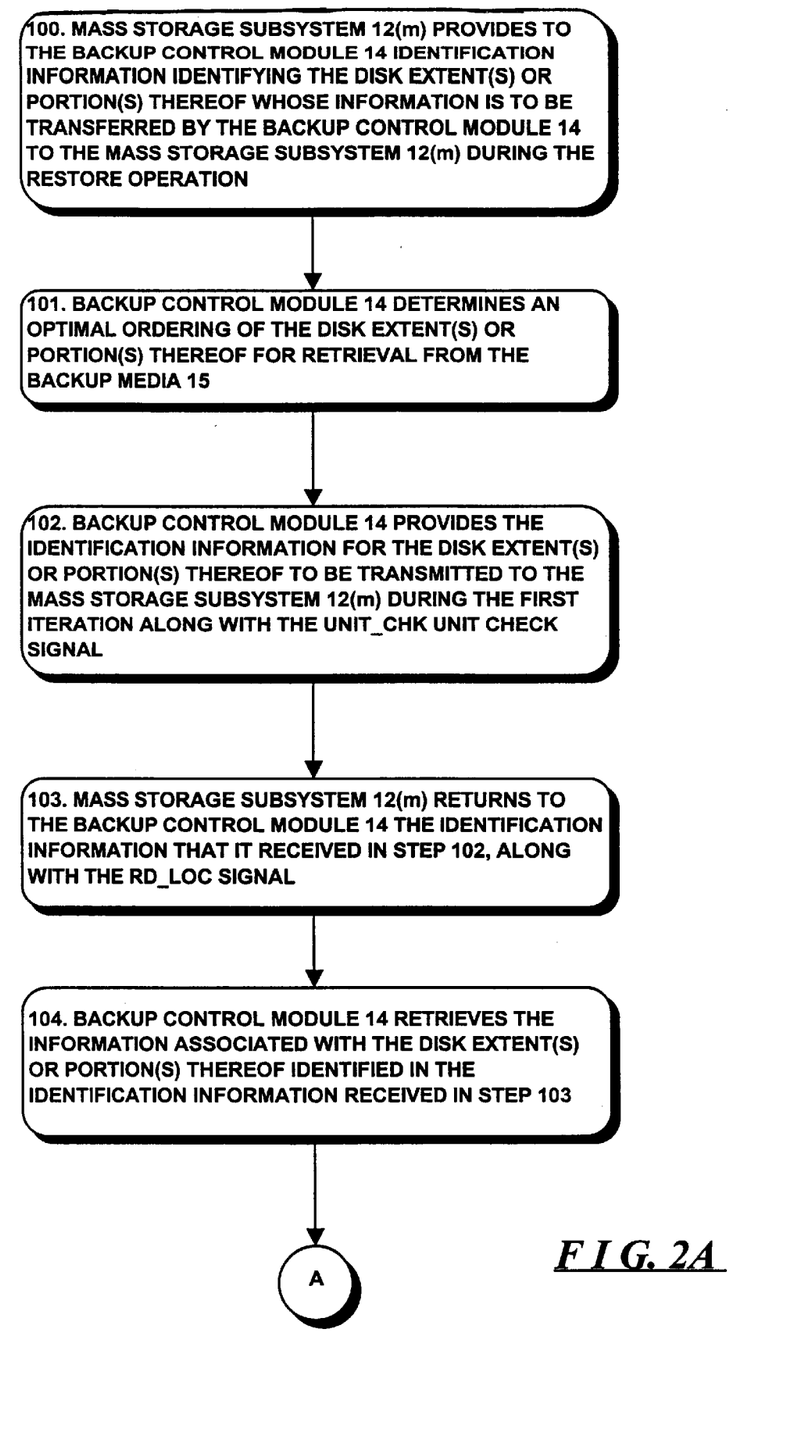
FIGS. 2A, 2B, 2C and 2D are flowcharts derailing operations performed by a mass storage subsystem and a backup control module, both forming part of the digital data processing system depicted in FIG. 1, in connection with a restore operation.

FIGS. 2A, 2B, 2C and 2D are flowcharts detailing operations performed by the mass storage subsystem 12(*m*) and the backup control module 14 in connection with a restore operation. with reference to FIG. 2A, the mass storage subsystem 12(*m*) initially provides to the backup control module 14 identification information identifying the disk extent(s) or portion(s) thereof whose information is to be transferred by the backup control module 14 to the mass storage subsystem 12(*m*) during the restore operation (step 100). Thereafter, the backup control module 14 will determine an optimal ordering of the disk extent(s) or portion(s) thereof for retrieval from the backup media 15 (step (101)

and provide the identification information for the disk extent(s) or portion(s) thereof to be transmitted to the mass storage subsystem 12(m) during the first iteration along with the UNIT_CHK unit check signal (step 102).

Figure 2B:
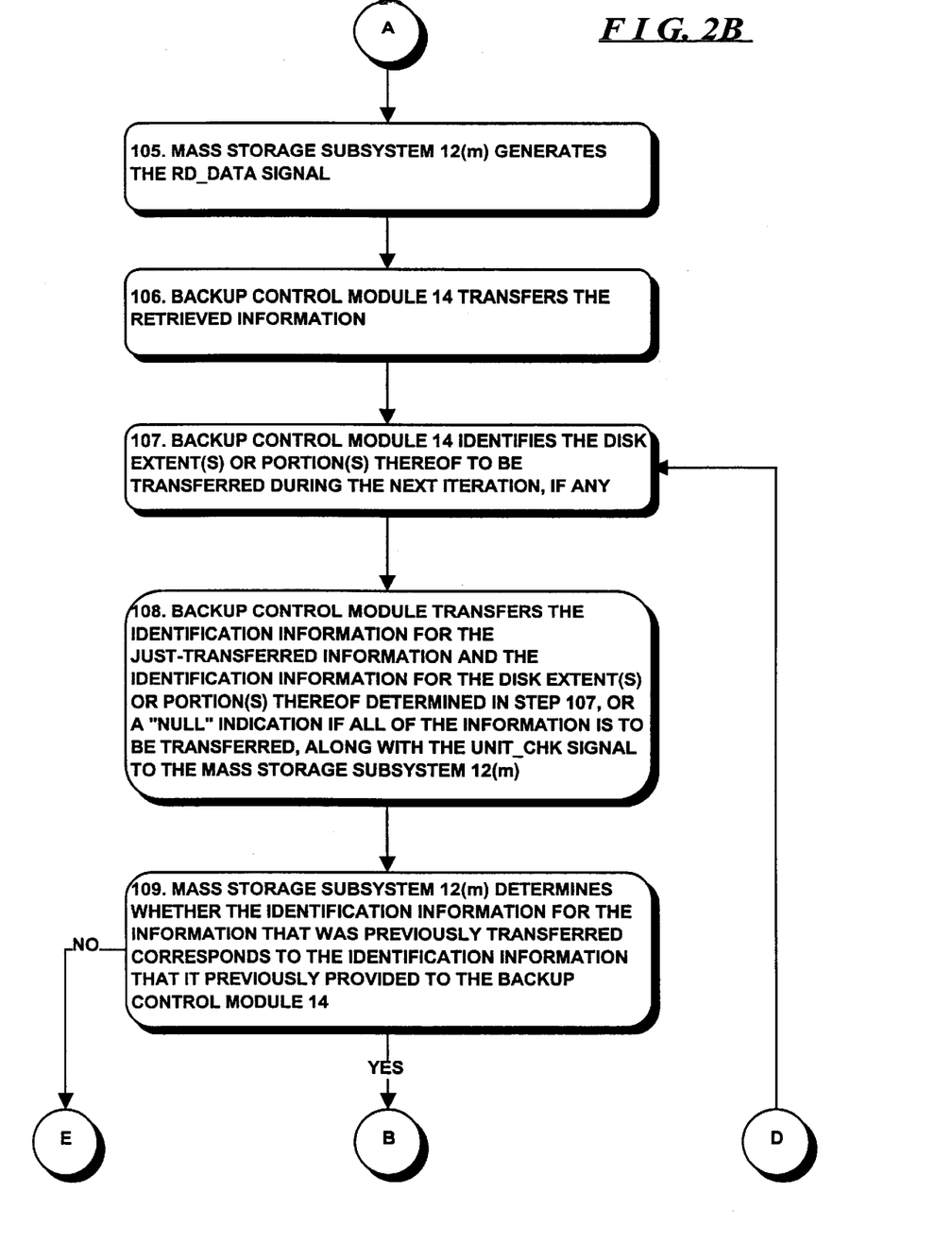

After the mass storage subsystem 12(m) receives the UNIT_CHK signal in step 102, it will return to the backup control module 14 the identification information that it received in step 102, along with the RD_LOC read location signal (step 103). The backup control module 14, after it receives the identification information in step 103, will retrieve the information associated with the disk extent(s) or portion9s) thereof identified in the identification information received in step 103 in preparation for transfer when the mass storage subsystem 12(m) generates the RD_DATA read data signal (step 104). Referring now to FIG. 2B, when the mass storage subsystem 12(m) thereafter generates the RD_DATA signal (step 105), the backup control module 14 will transfer the retrieved information (step 106).

After the information has been transferred in step 106, the backup control module 14 will identify the disk extent(s) or portion(s) thereof to be transferred during the next iteration, if any (step 107). Thereafter, the backup control module will transfer the identification information for the information that was transferred in step 105 and the identification information for the disk extent(s) or portion(s) thereof determined in step 107, or a "null" indication if all of the information is to be transferred, along with the UNIT_CHK signal to the mass storage subsystem 12(m) (step 108). The backup control module 14 can determine whether all of the information has been transferred from the information provided by the mass storage subsystem 12(m) in step 100. After the mass storage subsystem 12(m) receives the UNIT_CHK signal in step 108, it will determine whether the identification information for the information that was previously transferred corresponds to the identification information that was to have been transferred (step 109).

Figure 2C:
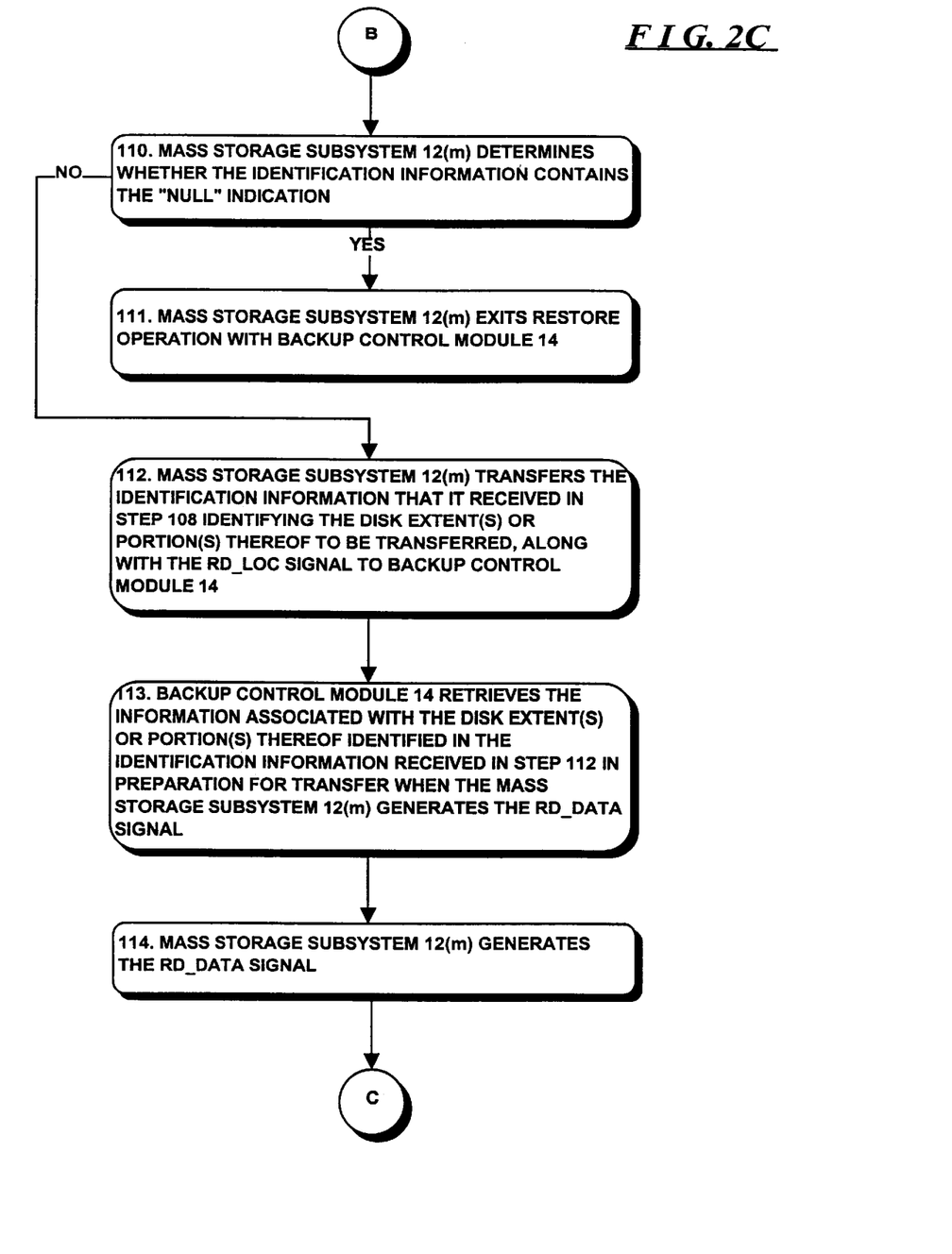
Figure 2D:
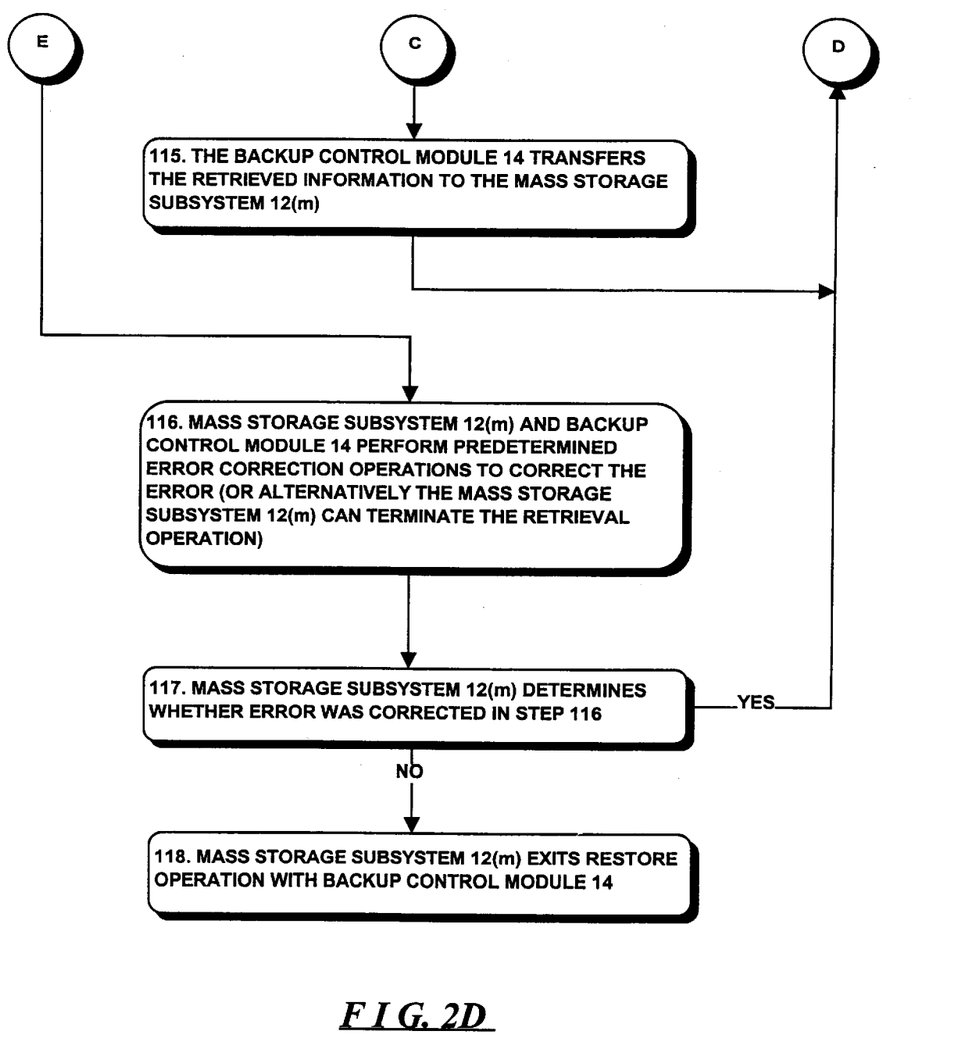

If the mass storage subsystem 12(m) makes a positive determination in step 109, then referring now to FIG. 2C, it will determine whether the identification information contains the "null" indication (step 110). If the mass storage subsystem 12(m) makes a positive determination in step 110, the restore operation will have been completed and it can exit (step 111). On the other hand, if the mass storage subsystem 12(m) makes a negative determination in step 110, that, is if it determines that the identification information does not contain the "null" indication, it transfer the identification information that it received in step 108 identifying the disk extent(s) or portion(s) thereof to be transferred, along with the RD_LOC read location signal to the backup control module 14 (step 1120). The backup control module 14, after it receives he identification information in step 112, will retrieve the information associated with the disk extent(s) or portion(s) thereof identified in the identification information received in step 112 in preparation for transfer when the mass storage subsystem 12(m) generates the RD_DATA read data signal (step 113). when the mass storage subsystem 12(m) thereafter generates the RD_DATA read data signal (step 114), then referring now to FIG. 2D, the backup control module 14 will transfer the retrieved information (step 115).

Following step 115, the operations will return to step 107 (shown in FIG. 2A). Operations described above in connection with steps 107 through 115 and shown in FIGS. 2A–2D, will be repeated through one or more iterations until the mass storage subsystem 12(m) makes a positive determination in either step 109, shown in FIG. 2A, or 110, shown in FIG. 2B. As noted above—if the mass storage subsystem 12(m) determines in step 110 that the identification information provided thereto by the backup control module 14 contains the null indication, in this case the restore operation will be completed and it can exit. On the other hand, if the mass storage subsystem 12(m) makes a negative determination in step 109, that is if it determines that the identification information for the information that was previously transferred does not correspond to the identification information that was to have been transferred, then referring now to FIG. 2D, the mass storage subsystem 12(m) and backup control module 14 can perform predetermined error correction operations to correct the error, or the mass storage subsystem 12(m) and backup control module 14 are able to correct the error in step 116 (step 117), operations can return to step 107 shown in FIG. 2B.

The invention provides a number of advantages. In particular, the invention provides an arrangement for efficiently transferring the information that is to be restored from the backup subsystem 13 in which information is backed up, in particular, from the backup control module 14, to the mass storage subsystem 12(m) during a restore operation.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system maybe operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. In a system comprising a back-up subsystem comprising back-up media, at least one mass storage subsystem connected to the back-up subsystem, and at least one host connected to each mass storage subsystem, a method for performing a host-independent restore operation between one of the at least one mass storage subsystems and the back-up system, the method comprising the steps of:

A. the mass storage subsystem, as master device and independent of each host, requesting the restore operation by providing to the back-up subsystem, as slave device, data identifiers identifying a plurality of data items to be transferred during the restore operation;

B. the back-up subsystem determining an ordering that it prefers for retrieval of the requested plurality of data items from the back-up media,     C. the back-up subsystem providing the requested data items to the mass storage subsystem in the determined preferred order in a plurality of iterations, each iteration identified by a data item identifier for the data item to be transferred in the current iteration.

2. A method according to claim 1 wherein the step of the back-up subsystem providing the requested data items to the mass storage subsystem includes the steps of:
  i) the back-up subsystem identifying each iteration by providing the mass storage subsystem with the data item identifier identifying the data item to be transferred during the current iteration;
  ii) the mass storage subsystem requesting the transfer of the data item thus identified; and
  iii) the back-up subsystem transferring the data item thus identified to the mass storage subsystem.

3. A method according to claim 2 wherein each iteration is further identified by a second data item identifier identifying the data item transferred during the previous iteration, and wherein the step of the back-up subsystem providing the requested data items to the mass storage subsystem further includes the step of the mass storage subsystem using the second data item identifier to confirm that the data item identified by the second data identifier corresponded to the data item that was to have been transferred during the previous iteration.

4. A system comprising
  A. a back-up subsystem, comprising back-up media, as a slave device,
  B. at least one mass storage subsystem connected to the back-up subsystem as a master device, and,
  C. at least one host connected to each mass storage subsystem,
  D. each mass storage subsystem, being configured to request a restore operation, independent of each host, by providing to the back-up subsystem data identifiers identifying a plurality of data items to be transferred during the restore operation;
  E. the back-up subsystem being configured to determine an ordering that it prefers for retrieval of the requested plurality of data items from the back-up media, and to provide the requested data items to the mass storage subsystem in the determined preferred order in a plurality of iterations, each iteration identified by a data item identifier for the data item to be transferred in the current iteration.

5. A system according to claim 4 wherein the back-up subsystem is configured to provide the requested data items to the mass storage subsystem by identifying each iteration by providing the mass storage subsystem with the data item identifier identifying the data item to be transferred during the current iteration and to transfer the data item thus identified to the mass storage subsystem in response to a request from the mass storage subsystem and wherein the mass storage subsystem is further configured to request the transfer of the data item thus identified in each of the plurality of iterations by the back-up subsystem.

6. A system according to claim 5 wherein the back-up subsystem is configured to further identify each iteration by a second data item identifier identifying the data item transferred during the previous iteration, and wherein the mass storage subsystem is further configured to use the second data item identifier to confirm that the data item identified by the second data identifier corresponded to the data item that was to have been transferred during the previous iteration.

7. A mass storage subsystem for use as a master device during host-independent restore operations in a system further comprising at least one host connected to the mass storage subsystem and a back-up subsystem comprising back-up media and connected to the mass storage subsystem as a slave device, the mass storage subsystem being configured to:
  A. request a restore operation, independent of each host, by providing to the back-up subsystem data identifiers identifying a plurality of data items to be transferred during the restore operation; and
  B. in response to the back-up subsystem determining an ordering that it prefers for retrieval of the requested plurality of data items from the back-up media, and providing the requested data items to the mass storage subsystem in the determined preferred order in a plurality of iterations, each iteration identified by a data item identifier for the data item to be transferred in the current iteration, requesting, in each of the plurality of iterations, the transfer of the data item thus identified by the back-up subsystem.

8. A mass storage subsystem according to claim 7 wherein, in response to the back-up subsystem further identifying each iteration by a second data item identifier identifying the data item transferred during the previous iteration, and wherein the mass storage subsystem is further configured to use the second data item identifier to confirm that the data item identified by the second data identifier corresponded to the data item that was to have been transferred during the previous iteration.

9. A back-up subsystem, comprising back-up media for use as a slave device in host-independent restore operations in a system further comprising at least one mass storage subsystem connected to the back-up subsystem as a master device, and at least one host connected to each mass storage subsystem, the back-up subsystem being configured:
  A. in response to a mass storage subsystem requesting a restore operation by providing to the back-up subsystem data identifiers identifying a plurality of data items to be transferred during the restore operation, to determine an ordering that it prefers for retrieval of the requested plurality of data items from the back-up media; and,
  B. to provide the requested data items to the mass storage subsystem in the determined preferred order in a plurality of iterations, each iteration identified by a data item identifier for the data item to be transferred in the current iteration.

10. A back-up subsystem according to claim 9 further configured to provide the requested data items to the mass storage subsystem by identifying each iteration by providing the mass storage subsystem with the data item identifier identifying the data item to be transferred during the current iteration and to transfer the data item thus identified to the mass storage subsystem in response to a request from the mass storage.

11. A back-up subsystem according to claim 10 further configured to further identify each iteration by a second data item identifier identifying the data item transferred during the previous iteration, in order that the mass storage subsystem may to use the second data item identifier to confirm that the data item identified by the second data identifier corresponded to the data item that was to have been transferred during the previous iteration.

* * * * *